March 16, 1971 W. D. HANCOCK 3,570,014
STENT FOR HEART VALVE

Filed Sept. 16, 1968 2 Sheets-Sheet 1

INVENTOR.
WARREN D. HANCOCK
BY

March 16, 1971 W. D. HANCOCK 3,570,014
STENT FOR HEART VALVE
Filed Sept. 16, 1968 2 Sheets-Sheet 2

INVENTOR.
WARREN D. HANCOCK
BY *Janowitz & Carr*

United States Patent Office 3,570,014
Patented Mar. 16, 1971

3,570,014
STENT FOR HEART VALVE
Warren D. Hancock, 10601 Calm Hill Circle,
Santa Ana, Calif. 92705
Filed Sept. 16, 1968, Ser. No. 759,858
Int. Cl. A61f 1/00
U.S. Cl. 3—1
36 Claims

ABSTRACT OF THE DISCLOSURE

A heart valve stent that includes an annular framework, preferably of bendable material, having three rounded apexes interconnected by support arms curved to incline away from the apexes. Additional support arms are included parallel to and axially beyond the first support arms. For use in the mitral position, the framework is circumscribed by an outer ring, which receives an annular element of felt or other suitable material. The heart valve is positioned on the stent, with its marginal portions overlapping it and affixed to it by sutures.

BACKGROUND OF THE INVENTION

Field of the invention

This invention relates to a supporting framework, or stent, for a natural or synthetic heart valve.

The prior art

At the present time, surgical techniques allow the transplanting of aortic valves in the hearts of human patients, where they are located in either the aortic or mitral position. In such an operation, a natural valve from an animal or human, or alternatively a synthetic valve, is implanted in the heart. There exists, however, the need for an improved means for securing and supporting the valve in the heart to assure its proper functioning and to avoid clotting or other difficulties. In addition, there has been lacking a suitable means for preparing natural heart valves in advance for implantation so that they may be stored until the requirement for use arises.

SUMMARY OF THE INVENTION

The present invention provides a stent for natural or synthetic heart valves that results in an improved means for supporting and grafting the heart valve in the patient. This invention makes possible the preparation of natural heart valves, such as those from animals or from humans, which are applied to the stents under controlled conditions and may be stored suitably so that an adequate supply of the heart valves may be maintained.

The stent is usable for valves to be used in both the aortic and mitral positions. It comprises a frame of generally tubular configuration that includes three arcuate apexes interconnected by support arms. The apexes are positioned at the approximate locations of the aortic commissures. By having an arcuate contour, they have a finite dimension in a direction circumferential of the stent, so that dimension variations in the valves may be accommodated. Upper and lower support arms interconnect the apexes, being scalloped to extend downwardly intermediate the apexes. Both serve as a means for securing the perimeter of the valve cusps to the stent by suturing or other appropriate means. Preferably, the stent is of deflectable material, such as stainless steel having some malleability, so that the upper support arms may be bent upwardly. By virtue of their scalloped shape, this increases the spacing of the arms from the central axis of the stent, so that the stent may be increased in width to fit individual valves of different configurations. The scalloped shape of the upper arms also allows placement of the valve in the aortic position without obstructing the coronary ostia.

When the stent is used for valves that are to be installed in the mitral position, it may be provided with a ring outwardly of the lower support arms. This ring provides a means for affixing the stent to the heart. A felt ring is secured to the stent at the location of the attaching ring, providing a hemodynamic seal and a suitable bed over which tissue can be attached. The mitral leaflet and endocardium are brought over the atrial aspect of the attaching ring and affixed to the felt ring.

Thus, as either version of the stent is used, there is no exposure of metal to the portions of the heart where clotting is a problem, and with only tissue exposed to the blood in the critical areas tendencies toward clotting are minimized.

An object of this invention is to provide an improved stent for natural or synthetic heart valves.

Another object of this invention is to provide a heart valve stent that can accommodate valves of different dimensions.

A further object of this invention is to provide an arrangement by which a heart valve is supported on a stent and secured so that only tissue or other material that does not promote the formation of clots will be exposed in critical areas of the heart where clotting might occur.

An additional object of this invention is to provide a stent that permits advance preparation under controlled conditions of heart valves which may be stored under suitable conditions until required.

A still further object of this invention is to provide a stent contoured to accommodate animal heart valves for use in xenografts.

These and other objects will become apparent from the following detailed description taken in connection with the accompanying drawing.

DESCRIPTION OF THE PREFERRED EMBODIMENT

Figure 1:
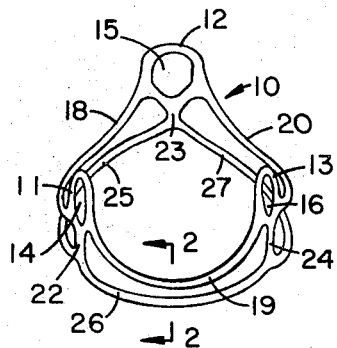
FIG. 1 is a perspective view of the stent of this invention constructed for use in the aortic position.
Figure 2:
FIG. 2 is an enlarged fragmentary sectional view taken along line 2—2 of FIG. 1, illustrating the rounded cross-sectional contour of the elements of the stent.
Figure 2:
Figure 3:
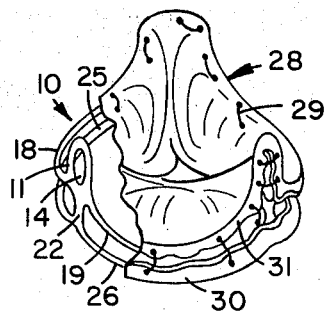
FIG. 3 is a perspective view, partially broken away, showing the stent of FIG. 1 with an aortic valve affixed thereto.

The stent 10, shown in FIGS. 1, 2 and 3, is for use in the aortic or pulmonary location. It constitutes an annular framework, circular in plan, that may be constructed of noncorrosive metal, such as stainless steel, or of plastic. When made of metal, it should have some malleability which permits the device to be deflected to alter its shape slightly from that illustrated. This has the advantage of allowing it to accommodate valves of different dimensions, as will be explained below. Preferably, the metal stent is produced from a single piece of material. This avoids any welded, brazed or other connections, eliminating the likelihood of galvanic corrosion after it has been implanted. All portions of the stent are rounded at their edges so that no sharp corners are presented (see FIG. 2).

The stent 10 includes three apical portions 11, 12 and 13, which are of generally oval shape including rounded upper portions. The central areas 14, 15 and 16 of the apical portions 11, 12 and 13 are cut away. Particularly when the stent is intended for use with animal valves, the apical portions are not distributed evenly around the perimeter of the stent 10. There is an equal angular spacing between the apical portions 11 and 12, and between the apical portions 12 and 13. However, the spacing between the apical portions 11 and 13 is less than that between the other two adjoining apexes. Usually, the spacing between the apexes 11 and 13 is within the range of approximately 17% to 33% under the spacing of the other apexes, preferably around 20% to 25% less. This is in order that the stent will conform to the spacing of the commissures of the valve to be applied to it, which, for animals, is very close to this proportioning.

Interconnecting the lower sides of the apical portions 11, 12 and 13 are upper support bars 18, 19 and 20. These are scalloped, being curved away from the apical portions 11, 12 and 13 so that they are concave toward the end of the stent where the apical parts are located.

Beneath the apexes 11, 12 and 13, as the device is illustrated, are short depending posts 22, 23 and 24 which extend parallel to the axis of the stent 10. To these posts are attached lower support arms 25, 26 and 27. The latter elements are shaped generally the same as the upper support arms 18, 19 and 20 and are spaced an equivalent distance from the stent axis. Again, therefore, the lower support arms are of scalloped configuration, being inclined downwardly intermediate the support posts. However, the lower support arms 25, 26 and 27 are not scalloped as deeply as are the upper arms.

As shown in FIG. 3, an animal aortic valve 28 is associated with the stent 10 for use in a xenograft. The valve 28 is secured to the stent by appropriate means, such as sutures 29. The valve commissures are positioned at the apexes, while the margins of the cusps conform to the scalloped configuration of the support arms. The marginal portions 30 and 31 of the valve cusps are extended over the support arms of the stent and overlap them, being doubled over the stent where the attachments are made. Consequently, the stent 10 is covered after the valve 28 is affixed.

The presence of the various apexes and support arms assures that there is a portion of the stent conforming to the shape of the valve 28 that is available for secure attachment of all peripheral parts of the valve. The arcuate upper portions of the apexes 11, 12 and 13 allow latitude in positioning of the commissures of the valve. There are some dimensional differences among all natural valves, and the spacing of the commissures may vary to some degree. With the upper portions of the apexes 11, 12 and 13 being arcuate, valves of different proportions may be accommodated and allowed to assume their natural contour while still being afforded ready and appropriate locations for attachment. In other words, if the spacing of the commissures does not correspond exactly to the distances between the centers of the apexes, the commissures nevertheless may be affixed to side portions of the apexes and thereby supported properly and in conformance with the natural valve contour.

Figure 4:
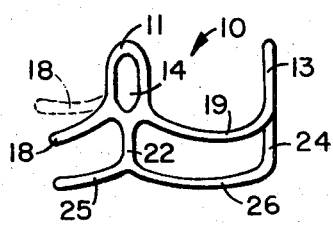
FIG. 4 is a side elevational view of the stent, showing how the support arms may be deflected for increasing the transverse dimension.

Another advantage lies in the scalloped configuration and deflectable characteristics of the upper support arms 18, 19 and 20. By bending the support arm upwardly, as indicated in phantom in FIG. 4, the spacing of the arm from the central axis of the stent 10 becomes increased. Therefore, for valves of larger dimensions or those of irregular proportions, the arms may be deflected as required to assure that the stent provides the precise fit needed for the valve. Accordingly, the stent may be given an exact configuration to conform to the individual valve being assoicated with it. The upper arms 18, 19 and 20 are scalloped more deeply than are the lower support arms to provide for a maximum amount of dimensional variation upon deflection of the upper arms.

This advantage is realized with stents of metal construction in which the upper support arms may be deflected. This does not hold true, however, for stents made of plastic, as suitable plastics cannot be bent to assume different shapes permanently. The scalloped configuration of the upper support arms not only makes dimensional changes possible, but also allows placement of the valve in the aortic position without obstructing the coronary ostia.

Figure 5:
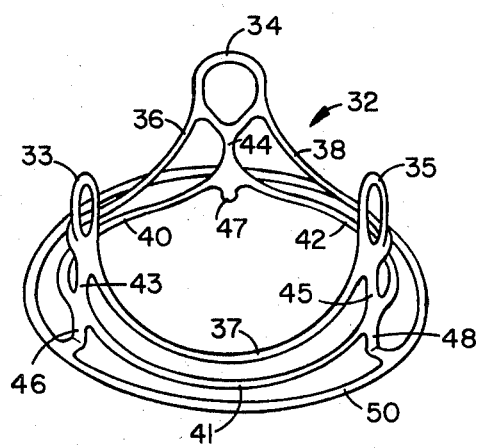
FIG. 5 is a perspective view of the stent constructed for use in the mitral position.

The stent 32 shown in FIG. 5, for mitral or tricuspid location, has the same general configuration as the aortic stent, but is of larger and slightly heavier construction. Additionally, it includes an outer ring, which is used in securing the stent to the heart.

The stent 32, as illustrated, includes rounded apexes 33, 34 and 35, each being cut away interiorly so as to be of annular and generally oval configuration. Downwardly scalloped upper support arms 36, 37 and 38 interconnect the apexes. Beneath the upper arms are similarly shaped but more shallowly scalloped lower support arms 40, 41 and 42. These connect at their ends to posts 43, 44 and 45 that extend below the apexes 33, 34 and 35, respectively.

Additional short posts 46, 47 and 48 extend downwardly, as the device is shown, from the junctures between the adjacent lower support arms 40, 41 and 42. At their upper ends, the posts 46, 47 and 48 are generally parallel to the axis. The bottom portions of the posts 46, 47 and 48, however, are bent substantially at right angles to extend generally radially to an outer attaching ring 50. The latter element is circular and of greater diameter than the annulus defined by the support arms.

The attachment of the valve 51 to the stent 32 for the mitral position is essentially the same as that of the valve 28 to the aortic stent 10. Again, suturing 52 normally is employed to effect the attachment of the marginal portions of the valve 51. In addition, however, an annular member 53 of felt or other suitable material is positioned around the stent 32 between the outer ring 50 and the annular structure provided by the posts 46, 47 and 48 and the lower arms 40, 41 and 42. The felt ring 53 provides a hemodynamic seal and a suitable bed over which tissue can be affixed. The mitral leaflet and the endocardium 54 are brought over the atrial aspect of the outer ring 50 (i.e., the end remote from the apexes) and affixed by sutures to the felt ring 53. This serves an important function in the prevention of blood clots. The ring 50 and other parts of the stent 32 are completely covered in the portions of the assembly that are positioned in localities of the heart where clotting is likely to take place. Therefore, in the critical zones of the heart where a thrombus may occur, any exposure of material that might promote clotting is minimized. The ring 50 provides a stable and secure means for affixing the stent and associated mitral valve to the heart. This is accomplished normally by sutures to attach the valve in the mitral position between the left atrium and ventricle.

Figure 7:
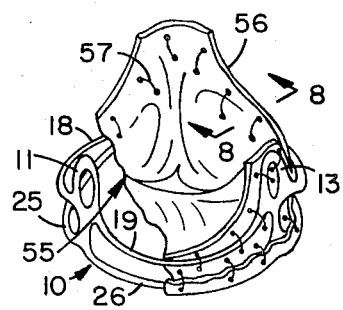
FIG. 7 is a perspective view, partially broken away, illustrating a modified attachment of the heart valve to the stent.
Figure 8:
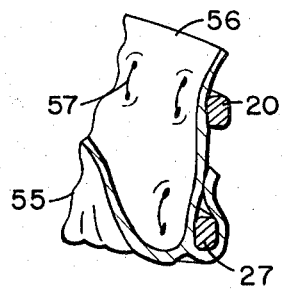
FIG. 8 is an enlarged sectional view taken along line 8—8 of FIG. 7.

Various modifications may be made in the manner in which the heart valve is mounted on the stent. For example, as shown in FIGS. 7 and 8, the heart valve 55 attached to the aortic stent 10 is not doubled over the upper perimeter of the stent. In other words, the upper margin of the heart valve is not arranged as illustrated in FIG. 3, where the margin 31 is shown doubled over the upper arms 18, 19 and 20 and the apexes 11, 12 and 13. Instead, the margin 56 of the heart valve 55 of FIGS. 7 and 8 is allowed to project beyond the stent to provide a free edge portion of tissue. Inwardly of this, sutures 57 secure the upper part of the heart valve to the stent. The marginal edge portion 56 provides a flap of material which may be used in attaching the heart valve 55 to the heart wall. This technique is preferred in some instances.

Figure 9:
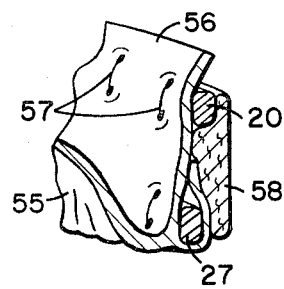
FIG. 9 is a sectional view similar to FIG. 8 with the addition of a ring around the outer perimeter of the assembly.

The arrangement of FIG. 9 is similar to that of FIG. 8 except that a ring has been added around the perimeter of the stent. This is an annular member, normally of a suitable cloth such as felt, or of sponge, held in place by sutures and extending around the exterior of the support arms below the apexes of the stent. This ring provides a suitable bed for fibrous ingrowth after the grafting of the valve in the heart. This also provides a compliant member capable of conforming to an irregular aortic root to assure a snug fit and a hemodynamic seal. Moreover, the annulus of the valve supported on the stent often is irregular, further adding to the desirability of the exteriorly applied member in such instances.

While illustrated in FIG. 9 in conjunction with an attachment of the heart valve to leave a free marginal flap 56, the ring 58 also is applicable when the heart valve is attached upon a doubling over of the tissue as indicated in FIG. 3. The ring 58 may be used on either the stent 10 for the aortic position or the stent 32 for the mitral position.

Figure 10:
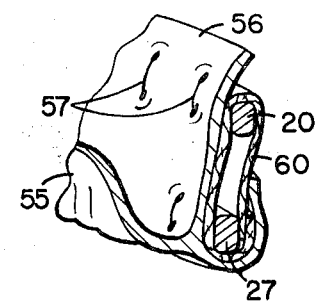
FIG. 10 is a view similar to FIG. 9, but in which a cloth member has been applied over the stent prior to attachment of the heart valve.

FIG. 10 illustrates a further modification in which an annular cloth element 60 is provided on the stent prior to attachment of the heart valve. The cloth 60 is, in effect, tubular in shape, providing a sleeve that has a continuous transverse wall which overlaps and receives the upper and lower arms of the stent. However, the annular cloth member 60 does not extend over the stent apexes. Normally, a ring 58 will be utilized in conjunction with an assembly that embodies the annular cloth element 60. This cloth covering of the inner and outer stent surfaces, which can be applied to either the aortic or the mitral stent, provides a means by which the tissue is more easily attached to the stent. It results also in a matrix for ingrowth and subsequent fixation of the donor valve by the host tissue.

Figure 6:
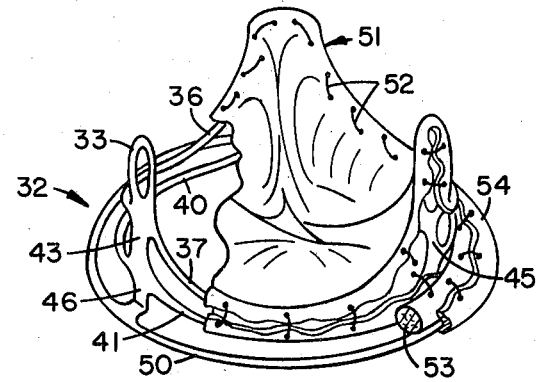
FIG. 6 is a perspective view, partially broken away, of an assembly of the stent of FIG. 5 and a heart valve.
Figure 11:
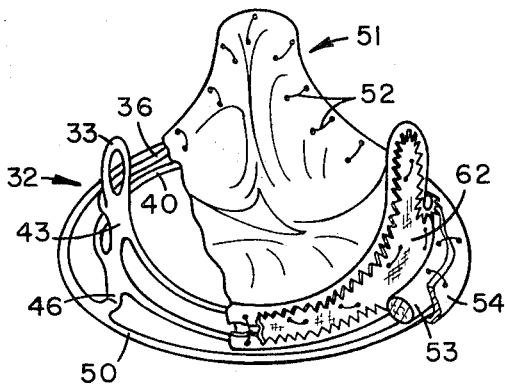
FIG. 11 is a perspective view, partially broken away, of a heart valve assembly for use in the mitral position in which a cloth covering is provided over certain marginal portions.

In FIG. 11, there is illustrated a heart valve 51 on the stent 32 for use in the mitral position similar to the arrangement of FIG. 6 but with a cloth layer 62 added over the periphery of the stent and inwardly of the outer ring 50. The layer of cloth 62 follows the contour of the stent and is fixed in place by sutures. The cloth layer 62 adds a matrix for fibrous ingrowth, facilitating the binding of the host tissue to the graft tissue. It also covers the sutures and the ragged edges of the margins of the heart valve that overlap the framework of the stent, providing an assembly of an improved neat appearance.

Figure 12:
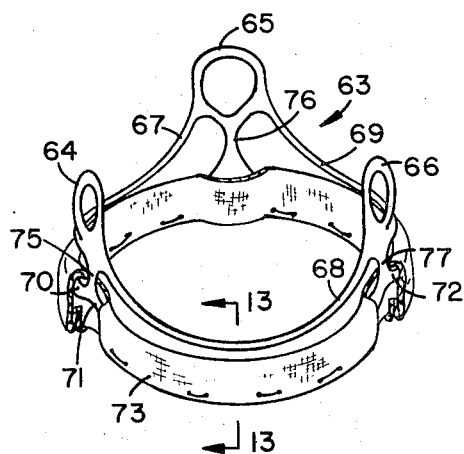
FIG. 12 is a perspective view of a heart valve for use in the mitral position in which there is a cloth attaching ring instead of a metal ring.
Figure 13:
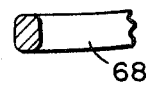
FIG. 13 is an enlarged sectional view taken along line 13—13 of FIG. 12.
Figure 13:
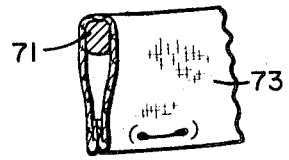

In the arrangement of FIGS. 12 and 13, the stent is intended for use in the mitral position, but is constructed without the metal ring 50 around its periphery. Instead, a cloth ring is provided, which serves a similar purpose, providing a means for attachment to the heart. The stent 63 shown in FIG. 12 is similar to the stent 32 in that it is provided with a comparable grouping of apexes and support arms, and larger and heavier than the stents for use in the aortic position. Thus, there are apexes 64, 65 and 66 interconnected by downwardly scalloped upper arms 67, 68 and 69 beneath which are lower arms 70, 71 and 72. Extending around the bottom periphery of the stent is a cloth ring 73. This is of doubled-over construction, with the lower arms 70, 71 and 72 received inside it. The outer edge, where the attachment is made to complete the double-walled cloth construction, is inwardly folded, as seen in FIG. 13. At the locations of the posts 75, 76 and 77, where the lower arms are connected to the upper portion of the stent, it is necessary to omit the outer layer of the cloth ring 73, as shown in FIG. 12.

It is to be remembered that the heart has four primary valves: two of which carry the blood away from the heart, the aortic and pulmonary valves; and two atrioventricular valves, the mitral and tricuspid valves. Since the aortic and pulmonary valves are similar in configuration as are the mitral and tricuspid valves, and since the device referred to herein as an aortic valve stent is equally suited to the pulmonary location, it is to be understood that the terms aortic and mitral are descriptive of the type of application and are not restrictive to a particular anatomic location.

The present invention also comprehends a device in which the spacings between the various apical portions are all unequal (each space being different from each other space). Using one space as the reference, the second is approximately 4–10% less than said reference (space), and the third space is 17% to 33% less than said reference (space).

It is to be understood that cloth may be used to cover the frame in any one of a number of configurations. The cloth may be a seamless cylinder, or flat stock cut, formed and seamed, or specially preformed material. The methods described previously in this specification are by way of specific illustration.

I claim:

1. A stent for a heart valve comprising a framework of annular configuration,
    said framework including spaced apical portions and arms interconnecting said apical portions,
        for thereby providing an attachment for the commissures and cusps of a heart valve, said arms being in two sets,
            one of said sets being adjacent said apical portions and the other of said sets being remote from said apical portions.

2. A device as recited in claim 1 in which said arms in both of said sets incline axially away from said apical portions intermediate said apical portions.

3. A device as recited in claim 2 in which at least some of said arms are deflectable for varying the distances thereof from the axis of said framework.

4. A device as recited in claim 2 in which said sets of said arms are spaced apart axially and are generally equally spaced from the axis of said framework,
    thereby providing said set of said arms adjacent said apical portions and said set of said arms remote from said apical portions.

5. A device as recited in claim 4 including, in addition, a cloth member extending over and receiving said arms.

6. A device as recited in claim 4 including, in addition, a cloth ring attached to and extending outwardly from said remote set of said arms for providing a means for attachment to a heart.

7. A device as recited in claim 4 including in addition
    a ring circumscribing said framework adjacent said remote set of arms,
    and including means projecting radially outwardly from said framework for securing said ring thereto.

8. A device as recited in claim 4 in which said arms in said one set are deflectable toward said apical portions for thereby increasing the radial spacing of said adjacent arms from the axis of said framework.

9. A device as recited in claim 4 in which said arms are curved in a scalloped configuration to so incline away from said apical portions intermediate said apical portions, said arms in said one set being deflectable and having a greater inclination away from said apical portions than that of said arms in said other set,
for providing a relatively large increase in the spacing of said arms in said one set from the longitudinal axis of said framework upon deflection of said arms in said one set toward said apical portions.

10. A device as recited in claim 1 including in addition a ring attached to said framework for providing a means for attachment of said framework in a heart in the mitral position, said ring circumscribing said framework adjacent said arms.

11. A device as recited in claim 10 in which said ring is a rigid member integral with said framework.

12. A device as recited in claim 10 in which said ring is a cloth member secured to said arms.

13. A device as recited in claim 1 in which each of said apical portions is rounded and has a substantial circumferential dimension for permitting said apical portions to accommodate heart valves of different dimensions.

14. A device as recited in claim 1 in which
said arms are arcuate and concave on the sides thereof adjacent said apical portions,
said arms in said one set being bendable toward said apical portions for thereby increasing their spacing from the axis of said framework.

15. A device as recited in claim 1 in which the spacing between two adjacent apical portions is less than the spacing between either of said two adjacent apical portions and the third of said apical portions.

16. A device as recited in claim 15 in which said spacing between said two adjacent apical portions is within the range of 17% to 33% less than said spacing between either of said two adjacent apical portions and the third of said apical portions.

17. A device as recited in claim 15 in which said spacing between said two adjacent apical portions is within the range of 20% to 25% less than said spacing between either of said two adjacent apical portions and the third of said apical portions.

18. A device as recited in claim 1 in which said framework is an integral member of substantially noncorrosive metal.

19. A device as recited in claim 18 in which said metal is malleable.

20. A device as recited in claim 1 in which said framework is an integral member of plastic material.

21. The invention as claimed in claim 1 in which there are three apical portions spaced unequal angular distances from each other, one space between two adjacent apical portions being a reference space, another space between two adjacent apical portions being 4–10% less than said reference space, another space between two adjacent apical portions being 17–33% less than said reference space.

22. A heart valve assembly comprising a stent,
said stent including a generally tubular framework having spaced apexes at one end,
a first seet of arms adjacent and interconnecting said apexes,
and a second set of arms spaced from said first set of arms and remote from said apexes,
said arms being inclined away from said apexes at locations intermediate said apexes,
a heart valve on said framework,
said heart valve having commissures substantially at said apexes and cusps having marginal portions adjacent said arms, the marginal portions of said heart valve overlapping said framework so that the interior of said framework is covered by said marginal portions of said heart valve,
and means for attaching said heart valve to said framework.

23. A device as recited in claim 22 in which said marginal portions of said heart valve are doubled over said framework.

24. A device as recited in claim 22 in which said heart valve includes a free marginal edge extending from said one end for providing a means for attachment to a heart.

25. A device as recited in claim 22 including in addition a ring of clothlike or spongelike material circumscribing said framework inwardly of said one end of said framework.

26. A device as recited in claim 22 including in addition a sleeve receiving said arms, portions of said heart valve extending over said sleeve.

27. A device as recited in claim 26 in which said sleeve is of cloth material.

28. A heart valve assembly for use in the mitral position comprising
a stent,
said stent including a generally tubular framework having spaced apexes at one end and arms interconnecting said apexes,
said arms being inclined away from said apexes at locations intermediate said apexes,
a ring extending outwardly of said arms adjacent the opposite end of said framework,
an annular member circumscribing said arms,
means attaching said annular member to said framework,
a heart valve on said framework,
said heart valve having cusps having marginal portions overlapping said framework,
means attaching said marginal portions to said framework,
said heart valve having additional portions extending over the end of said ring remote from said apexes and toward said annular member,
and means attaching said additional portion of said heart valve to said annular member.

29. A device as recited in claim 28 in which said annular member is constructed of felt.

30. A device as recited in claim 28 including in addition a layer of cloth over said overlapping marginal portions for covering the same and providing for fibrous ingrowth upon being grafted in a heart.

31. A device as recited in claim 28 in which said ring is integral with said framework.

32. A device as recited in claim 28 in which said ring is a cloth member attached to said arms.

33. A stent for a heart valve comprising
a framework of annular configuration,
said framework including spaced apical portions and arms interconnecting said apical portions,
for thereby providing an attachment for the commissures and cusps of a heart valve,
a ring attached to said framework for providing a means for attachment of said framework in a heart in the mitral position,
said ring circumscribing said framework adjacent said arms,
and an annular member interposed between said ring and said framework for providing a bed for the attachment of portions of the valve extended over the atrial aspect of said ring, and for providing a hemodynamic seal upon grafting in a heart.

34. A device as recited in claim 33 in which said annular member is constructed of felt.

35. A stent for a heart valve comprising
a framework of annular configuration,
said framework including spaced apical portions and arms interconnecting said apical portions,
for thereby providing an attachment for the commissures and cusps of a heart valve,
each of said apical portions being rounded and having a substantial circumferential dimension for permitting said apical portions to accommodate heart valves of different dimensions, said apical portions being annular and of generally oval shape.

36. A stent for a heart valve comprising
a framework of annular configuration,
said framework including spaced apical portions, arms interconnecting said apical portions, for thereby providing an attachment for the commissures and cusps of a heart valve, said arms inclining away from said apical portions intermediate said apical portions, said arms including a set of at least two of said arms intermediate each adjacent pair of apical portions,
said arms in each set being spaced apart axially and generally equally spaced from the axis of said framework, thereby providing arms adjacent said apical portions and arms remote from said apical portions,
a ring circumscribing said framework adjacent said remote arms,
and a relatively short post extending axially away from said apical portions at the junctures of said remote arms,
said posts including portions bent outwardly to provide a radially projecting means for securing said ring to said framework.

References Cited

FOREIGN PATENTS 158,988  2/1964  Russia _____ 3—1

OTHER REFERENCES

Braunwald et al., "Simplified Insertion of Aortic Homograph Valves With Nonthrombogenic Prosthetic Frames," Transactions, Amer. Soc. for Artificial Internal Organs, vol. XIII, June 16, 1967.

Geha et al., "Fixation of Aortic Valve Homographs With Metal Rings," Thoracic and Cardiovascular Surgery, vol. 54, No. 5, November 1967.

Weldon et al., "A Prosthetic Stented Aortic Homograft for Mitral Valve Replacement," Journal of Surgical Research, vol. 6, No. 12, December 1966, pp. 548–552.

RICHARD A. GAUDET, Primary Examiner

J. B. MITCHELL, Assistant Examiner